(12) United States Patent
Bann

(10) Patent No.: US 7,038,573 B2
(45) Date of Patent: May 2, 2006

(54) SYSTEMS AND METHODS FOR TRACKING THE LOCATION OF ITEMS WITHIN A CONTROLLED AREA

(75) Inventor: Gary Bann, San Diego, CA (US)

(73) Assignee: Single Chip Systems Corporation, San Diego, CA (US)

( * ) Notice: Subject to any disclaimer, the term of this patent is extended or adjusted under 35 U.S.C. 154(b) by 32 days.

(21) Appl. No.: 10/658,016

(22) Filed: Sep. 8, 2003

(65) Prior Publication Data

US 2005/0052281 A1   Mar. 10, 2005

(51) Int. Cl.
*H04Q 5/22*   (2006.01)
(52) U.S. Cl. .................. 340/10.1; 340/10.52; 705/22; 235/385
(58) Field of Classification Search .... 340/10.1–10.52; 705/28, 22, 29; 235/385
See application file for complete search history.

(56) References Cited

U.S. PATENT DOCUMENTS 6,496,806 B1   12/2002   Horwitz et al.

*Primary Examiner*—Michael Horabik
*Assistant Examiner*—M Shimizu
(74) *Attorney, Agent, or Firm*—Baker & McKenzie LLP

(57) ABSTRACT

A location tracking system for tracking the location of items within a controlled area comprises a plurality of RFID tags located according to the required accuracy of the location determinations. Vehicles configured to transport items being tracked include two RFID interrogators configured to acquire RFID information from the plurality of RFID tags and to transmit the RFID tag information to a location authority. The separation the two RFID interrogators is set based on the spacing of the plurality of RFID tags such that the required accuracy results. The location authority can then simply map the RFID tag information to coordinate information stored for each of the plurality of tags to obtain the location of the vehicle and, therefore, the item being transported.

47 Claims, 5 Drawing Sheets

SYSTEMS AND METHODS FOR TRACKING THE LOCATION OF ITEMS WITHIN A CONTROLLED AREA

RELATED APPLICATIONS INFORMATION

This application is related to U.S. patent application Ser. No. 10/658,634 No. 38326.00007.UTL1), entitled "Systems and Methods for Configuring a Warehouse for Tracking the Location of Items within a Controlled Area," filed Sep. 8, 2003.

BACKGROUND

1. Field of the Inventions

The field of the invention relates generally to tracking using radio frequency identification tags and more particularly to tracking inventory on vehicles in a warehouse setting.

2. Background Information

In a warehouse environment, for example, the ability to track and control inventory can be vital. To aid in tracking inventory, floor embedded RFID tags have been used to facilitate the process of locating vehicles used to move the inventory in warehouses. The embedded RFID tags provide a fixed reference point to which tracking systems can be calibrated in real-time. In such a conventional tracking system, sensors on-board the vehicle are often used to provide direction and speed information to a processor which then uses "dead reckoning" algorithms to locate the position of the vehicle. Such algorithms must, however, periodically be reset from known benchmarks. It is for this purpose that RFID tags have recently been incorporated into conventional tracking systems. For example, Radio Frequency Identification (RFID) tags have been used to facilitate tracking the location of forklifts in a warehouse. Tracking the forklifts can, e.g., comprise tracking the position, orientation, velocity, and speed of the forklift.

FIG. 1 illustrates a top view of an exemplary, conventional tracking system that uses RFID tags from. As can be seen, a plurality of RFID tags 102 can be aggregated into a plurality of arrays 100. The warehouse can be segmented into a plurality of geometrically equivalent areas 150. Each of the plurality of arrays 100 can then be deployed along the perimeter of areas 150 as illustrated by exemplary area 150a. When a forklift 110 passes over a RFID tag 102 in an array 100, the tag is read by an RFID interrogator (not shown) installed on forklift 110. Information from the tag can be used to help determine the location of the RFID interrogator (not shown) and, therefore, to determine the location of forklift 110.

Also installed on forklift 110, however, are devices such as directional gyros and speed sensors for measuring motion parameters of forklift 110. The measured parameters can include, for example, speed, direction, and distance traveled for forklift 110. These parameters along with the last known location of the RFID interrogator, and the elapsed time since the last readings were made can be used to calculate an approximate location of forklift 110 when it resides within an area 150 where there are no RFID tags 102 for reference, such as when forklift 110 is at a position 160.

For example, the measured parameters can be transmitted to a central server that can be configured to use the "dead reckoning" approach to estimate the location of forklift 110. The estimation will, however, necessarily comprise errors. To help correct for the errors, the location estimation can be adjusted whenever forklift 110 passes within range of a RFID tag 102 allowing the RFID interrogator to obtain RFID tag information. The RFID tag information can then also be sent to the central server, which can use the RFID tag information to determine with a higher degree of accuracy the location of forklift 110.

The location of forklift 110 can be used to track the location of items the forklift is transporting. Thus, the items can be tracked throughout the warehouse.

The problem with the approach described in relation to FIG. 1 is that the equipment for measuring speed, direction, and other motion parameters can be very costly to equip on all forklifts in a warehouse. Further, if a forklift 110 moves for a prolonged period within an area 150 without coming into range of an RFID tag 102, errors in the location estimation will accumulate reducing the accuracy of location estimations.

SUMMARY OF THE INVENTION

A location tracking system for tracking the location of items within a controlled area comprises a plurality of RFID tags located according to the required accuracy of the location determinations. Vehicles configured to transport items being tracked can then comprise two RFID interrogators configured to acquire RFID information from the plurality of RFID tags and transmit the RFID tag information to a location authority. The separation the two RFID interrogators can be set based on the spacing of the plurality of RFID tags such that the required accuracy results. The location authority can then simply map the RFID tag information to coordinate information stored for each of the plurality of tags to obtain the location of the vehicle and, therefore, the item being transported.

These and other features, aspects, and embodiments of the invention are described below in the section entitled "Detailed Description of the Preferred Embodiments."

BRIEF DESCRIPTION OF THE DRAWINGS

Features, aspects, and embodiments of the inventions are described in conjunction with the attached drawings, in which.

DETAILED DESCRIPTION OF THE PREFERRED EMBODIMENTS

Figure 1:
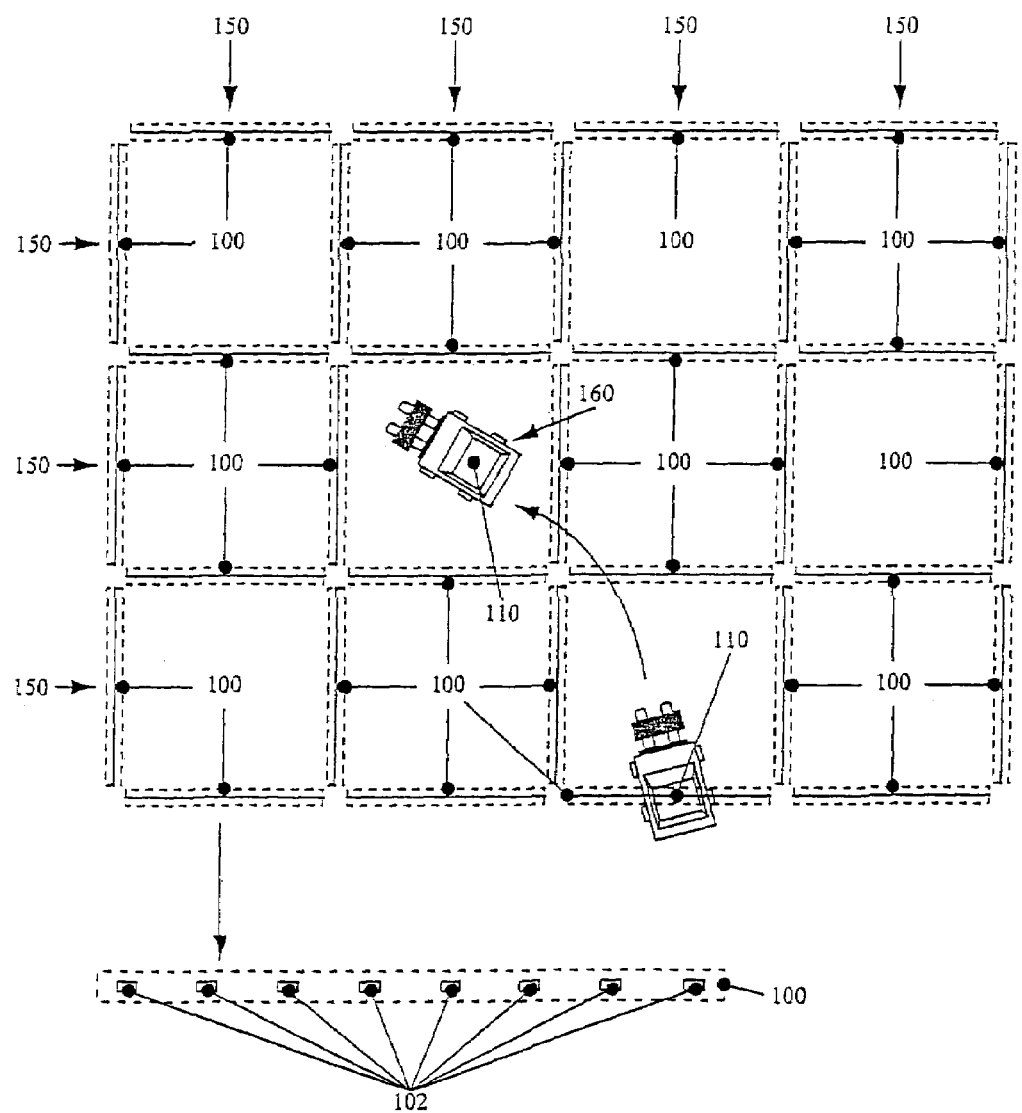
FIG. 1 is a diagram illustrating an exemplary tracking system that uses RFID tags to track the location of items within a controlled area.
Figure 2:
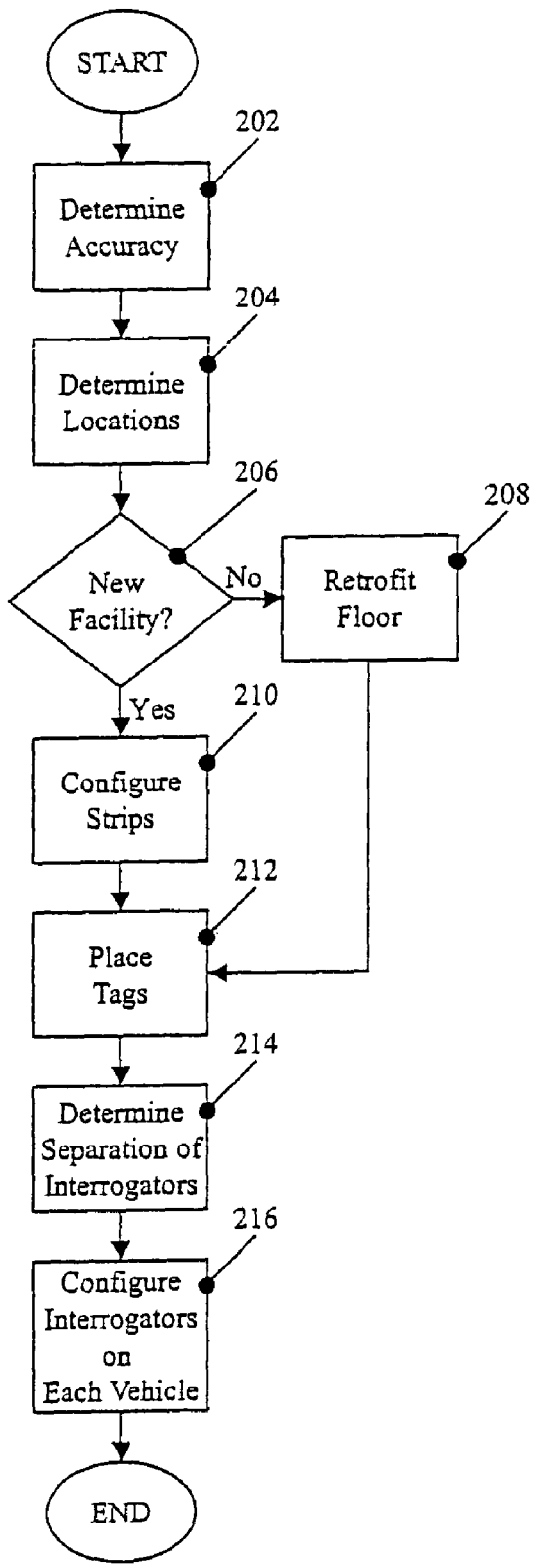
FIG. 2 is a flow chart illustrating an example method for configuring a controlled area with RFID tags for tracking the location of items within the controlled area in accordance with one embodiment of the invention.

FIG. 2 is a flow chart illustrating an example method for configuring a controlled area with RFID tags for tracking the location of items within the controlled area in accordance with one embodiment of the systems and methods described herein. A first step 202 comprises determining the desired accuracy for the location of the items. Next, in step 204, locations for the RFID tags are determined based on the desired, or required, accuracy so that the desired accuracy can be achieved.

For example, if the accuracy required is +/−1 foot, then the RFID tags should be located no farther than 1 foot apart, i.e., the RFID tags should be located using a spacing of 1 foot or less. If a spacing of less than 1 foot is used, then finer resolution can be achieved. In certain embodiments, the RFID tags are located in a grid pattern on the floor of the controlled area, which can for example be part of a warehouse. Thus, to ensure the appropriate resolution, the grid spacing should be, e.g., less than or equal to 1 foot.

Further, the locations of the RFID tags should be referenced to one or more known locations in the controlled area. In other words, one or more markers, the location of which is known, should be used as references for the location of the RFID tags. The location of the RFID tags in relation to these markers should be known with a relatively high degree of precision.

In step 206, it is determined if the RFID tags are being installed in a new facility. If this is the case, then the RFID tags can, for example, be configured into strips in step 210, which can in turn be placed on the floor covering the controlled area. To maintain the requisite spacing, the RFID tags should be spaced accordingly when assembled in to the strips and the strips should be placed accordingly onto the floor. The strips can be glued, or otherwise affixed to the floor and covered with a protective material. The protective material can, for example, comprise terrazzo, which can be poured over the affixed strips.

If it is determined in step 206 that the facility is not new, then the floor of the facility, comprising the controlled area, can be retrofitted to accommodate the RFID tags. Retrofitting old floors can be accomplished using several methods. For example, the RFID tags can be embedded in low profile markers, e.g., similar to those used in freeway lanes. The markers should then be placed with the appropriate spacing as determined in step 204. For example, a chalked grid of appropriate spacing can be applied to the floor. At each intersection, a marker can be glued to the concrete. This method can be used, for example, where the application can tolerate small bumps.

Alternatively, a coring device can be used to bore holes in the floor, the holes being spaced appropriately. For example, circular flat bottom holes can be bored into a cement floor approximately ½" deep. A poker chip sized RFID tag can then be inserted into each hole. The holes can then be filled with a quick acting cement patch. This method can be used, for example, when a floor must be kept level.

Once all the tags are placed in step 212, the locations for mounting interrogators on vehicles used to transport items within the controlled area can be determined, in step 214. The interrogators can be located based on the spacing to the RFID tags determined in step 204. As explained below, a vehicle configured in accordance with the systems and methods described herein can be configured with two interrogators in order to eliminate costly measurement devices, such as directional gyros. In certain embodiments, the RFID interrogators are positioned along the centerline of the vehicle. Preferably, however, the interrogators are separated by a distance that is greater than the spacing of the RFID tags. For example, it has been shown that a separation distance that is 4 times the tag spacing can produce sufficiently accurate results.

It should be noted that for purpose of this specification and the claims that follow the term RFID interrogator can refer to a full RFID interrogator comprising a decoder, RF transceiver, and antenna. Alternatively, a single interrogator can be used with multiple antennas. In the later case, the separation distance and location determined in step 214 can refer to the location and separation distance of the antennas.

In step 216, RFID interrogators can be mounted on all of the vehicles used to transport items within the controlled area based on the locations determined in step 214.

Figure 3:
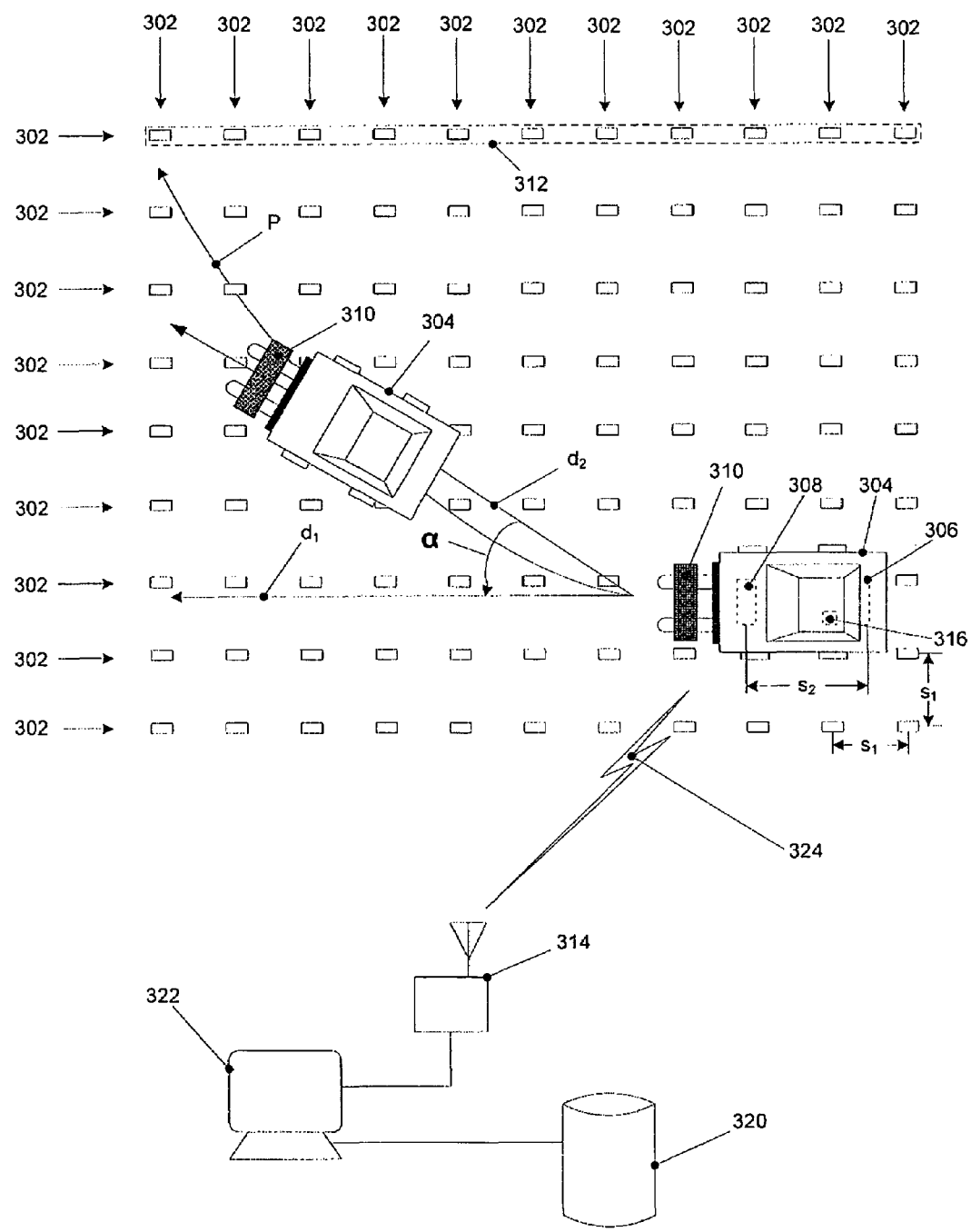
FIG. 3 is a diagram illustrating a controlled area configured with RFID tags in accordance with the method of FIG. 2.

FIG. 3 is a diagram illustrating a controlled area configured with RFID tags in accordance with the method of FIG. 2. Thus, for example, a plurality of RFID tags 302 can be configured in a grid with an associated spacing ($S_1$) sufficient to ensure that location information of the desired accuracy can be obtained. The gird can be installed, for example, in the floor of a facility comprising controlled area 300 in which items are being tracked. The plurality of RFID tags 302 can be configured in strips 312 if the facility is new. Alternatively, the plurality of RFID tags 302 can be installed via various retrofitting methods if the facility is an existing one.

In the example of FIG. 3, a forklift 304 is used to move an item 310 within controlled area 300. A location authority 320 can be configured to track the location of items 310 within controlled area 300. For example, the location of items 310 can be stored in a database 322 that comprises part of, or is interfaced with, location authority 320. Location authority 320 can, therefore, comprise a server, or other computer system, configured to run a location application for tracking the location of items 310.

Forklift 310 can comprise two RFID interrogators 308 and 306 separated by a distance ($S_2$) in relation to each other. As explained above, the separation distance ($S_2$) should be sufficient in relation to spacing ($S_1$) to provide the required accuracy. It should also be remembered that RFID interrogators 306 and 308 can be full RFID interrogators or separate antennas interfaced with a single RFID interrogator, depending on the embodiment.

RFID interrogators 306 and 308 can be configured to read information from RFID tags 302 and to relay the information to location authority 320. For example, forklift 304 can also comprise a wireless communication device 316 configured to transmit the RFID tag information over a wireless communication link 324. Similarly, location authority 320 can be interfaced with a wireless communication device 314 configured to receive the RFID tag information transmitted over wireless communication link 324.

Wireless communication device 314 can also be configured to transmit requests for information generated by location authority 320 to forklift 304 over wireless communication link 324. Thus, wireless communication devices 314 and 316 can each be configured for two-way communication, i.e., wireless communication devices 314 and 316 can comprise wireless communication transceivers. Wireless communication devices 314 and 316 can be configured to implement any wireless communication standard, the only requirement being that the range of wireless communication link 324 be sufficient to enable location authority 320 to track the forklift 304 throughout controlled area 300 as required by a specific implementation.

Thus, location authority 320 can be configured to use the RFID tag information read by RFID interrogators 306 and 308 to track the location of forklift 304, e.g., using information stored in a database 322. The term database is simply meant to infer that location authority 320 can have available to it information that is organized in some fashion and that can be used to track the location of forklift 304 and item 310. Further, the term database is also meant to infer that location authority 320 can be configured to store location related information in some organized fashion.

Figure 4:
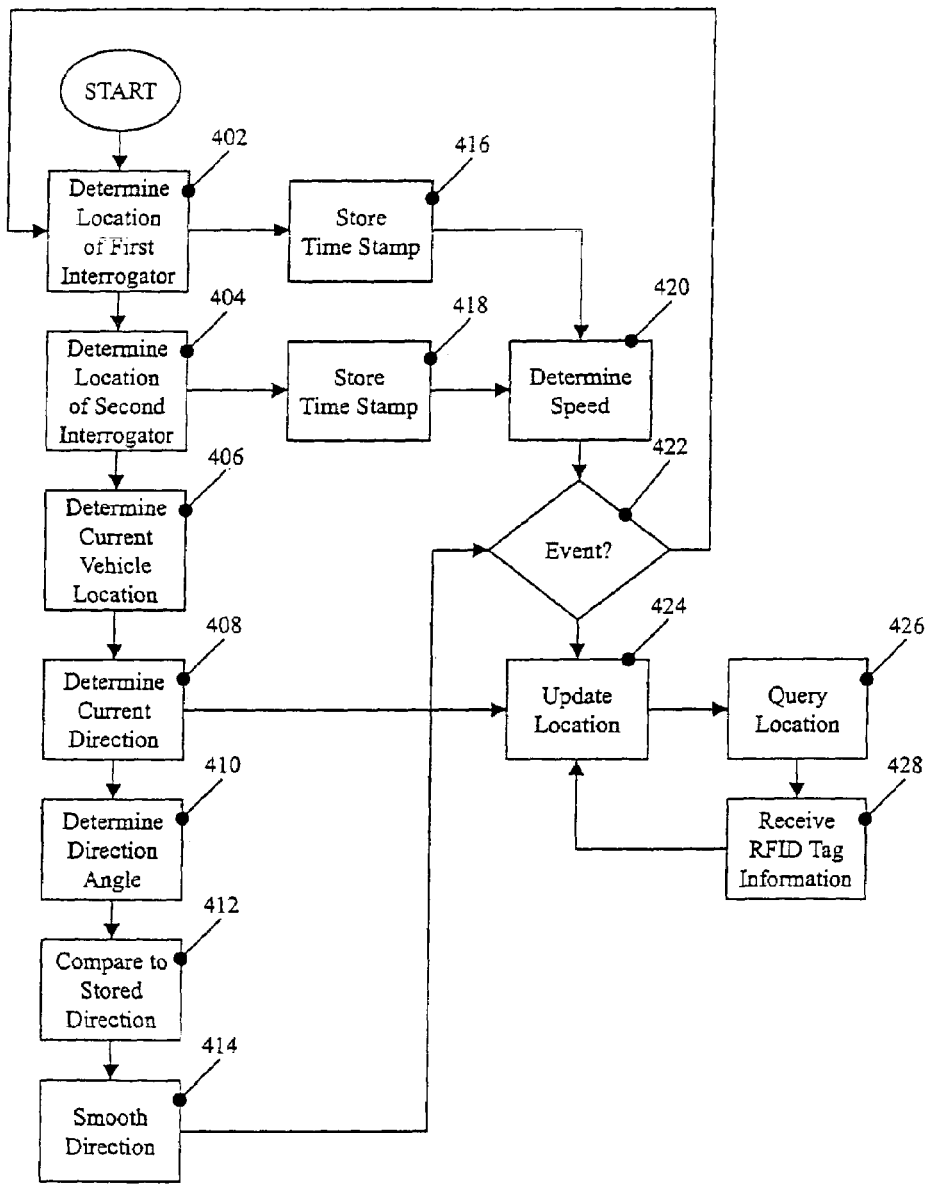
FIG. 4 is a flow chart illustrating an example process for tracking the location of an item within the controlled area of FIG. 3 in accordance with one embodiment of the invention.

FIG. 4 is a flow chart illustrating and example method for tracking the location of an item within a controlled area in accordance with one embodiment of the systems and methods described herein. In other words, location authority 320 can, for example, be configured to implement a location tracking application that causes location authority 320 to perform the steps illustrated in FIG. 4.

First, in step 402, location authority can determine the location of front RFID interrogator 308. For example, as forklift 304 passes over RFID tags 302, RFID interrogator 308 can be configured to read information from tags 302. The information read by interrogator 308 can then be sent, e.g., via wireless communication link 324, to location authority 320. Location authority 320 can be configured to use the RFID tag information to determine the location of front RFID interrogator 308.

The RFID tag information can, for example, comprise a unique identifier that identifies a specific RFID tag. Database 322 can be configured to store a map of the locations of each RFID tag based on the unique identifiers. Thus, when location authority 320 receives RFID tag information, it can be configured to simply perform a look-up of the location of the RFID tag associated with the information received in order to locate front RFID interrogator 308.

The RFID tag information can be associated with a time stamp in step 416 and stored, e.g., in database 322, for later use. Alternatively, or in addition, the actual location of front RFID interrogator 308 can be time stamped and stored in step 416.

Similarly, in step 404, location authority 320 can be configured to determine the location of rear RFID interrogator 306. The RFID tag information and/or location of RFID interrogator 306 can then be time stamped and stored in step 418.

Location authority 320 can be configured to determine, in step 406, the location of forklift 304 using the RFID tag information received in step 402 and/or step 404. For example, in one implementation, the last reported location for front RFID interrogator 308 is simply used as the present location of forklift 304. The location of forklift can be continually updated by location authority 320 and, for example, stored in database 322. Further, the location of item 310 can also be updated (step 424) either continually, periodically, or even non-periodically, as RFID tag information is received.

Location authority 320 can be configure to then determine the direction of forklift 304 in step 408 using, for example, the RFID tag information received in step 402 and/or stem 404. For example, based on the RFID tag information received from both RFID interrogators 306 and 308, location authority 320 can be configured to determine the direction ($d_1$) that forklift 304 is heading. As forklift 304 travels, e.g., along path (p), the directional information can be updated to show that forklift 304 has changed direction and is traveling along direction ($d_2$). The directional information can be updated and stored by location authority 320.

In addition, location authority 320 can be configured to determine a directional angle ($\alpha$) in step 410, which can be stored, e.g., in database 322. Then, in step 412, location authority 320 can be configured to compare the current directional angle ($\alpha$) with one or more previously determined directional angles ($\alpha$) in order to smooth out, in step 414, the direction associated with forklift 304.

In step 420, the location authority 320 can be configured to determine the speed of forklift 304 based on the time stamped information stored in step 416 and/or step 418.

Forklift 304 can also comprise an appropriate sensor or other feedback, configured to sense when a particular event has occurred, e.g., the pick-up or loading of item 310, the drop off or unloading of item 310, etc. This information can be sent to location authority 320, e.g., via wireless communication link 324 or via some other method such as manual input. The sensor can be configured to sense, for example, an increase or decrease in weight on the forks of forklift 304. An increase in weight can indicate that forklift 304 has picked up item 310, while a decrease in weight can indicate that item 310 was unloaded.

Accordingly, in step 422, location authority 320 can be configured to determine that an event has occurred and to update the location of item 310 in response.

It should be noted that location authority 320, or some portion thereof, can actually reside onboard forklift 304. Thus, the location, direction, speed, etc. of forklift 304 can be determined by an onboard location authority 320 and transmitted to an external system, such as a materials handling system, to track the location of items 310. If such is the case, then location authority 320 can be configured to transmit location and other information, for example, each time and event is detected in step 422.

Location authority 320 can also be configured to generate a request for information, in step 426, that can be transmitted, e.g., via wireless communication link 324 to forklift 304. Information from RFID interrogators 306 and 308 can be received, in step 428, in response to the request sent in step 426. Alternatively, the request sent in step 426 can be generated by, e.g., a material handling system and sent to an onboard location authority 320. Thus, the response in step 428 can comprise location, direction, speed, etc., as determined by onboard location authority 320.

Figure 5:
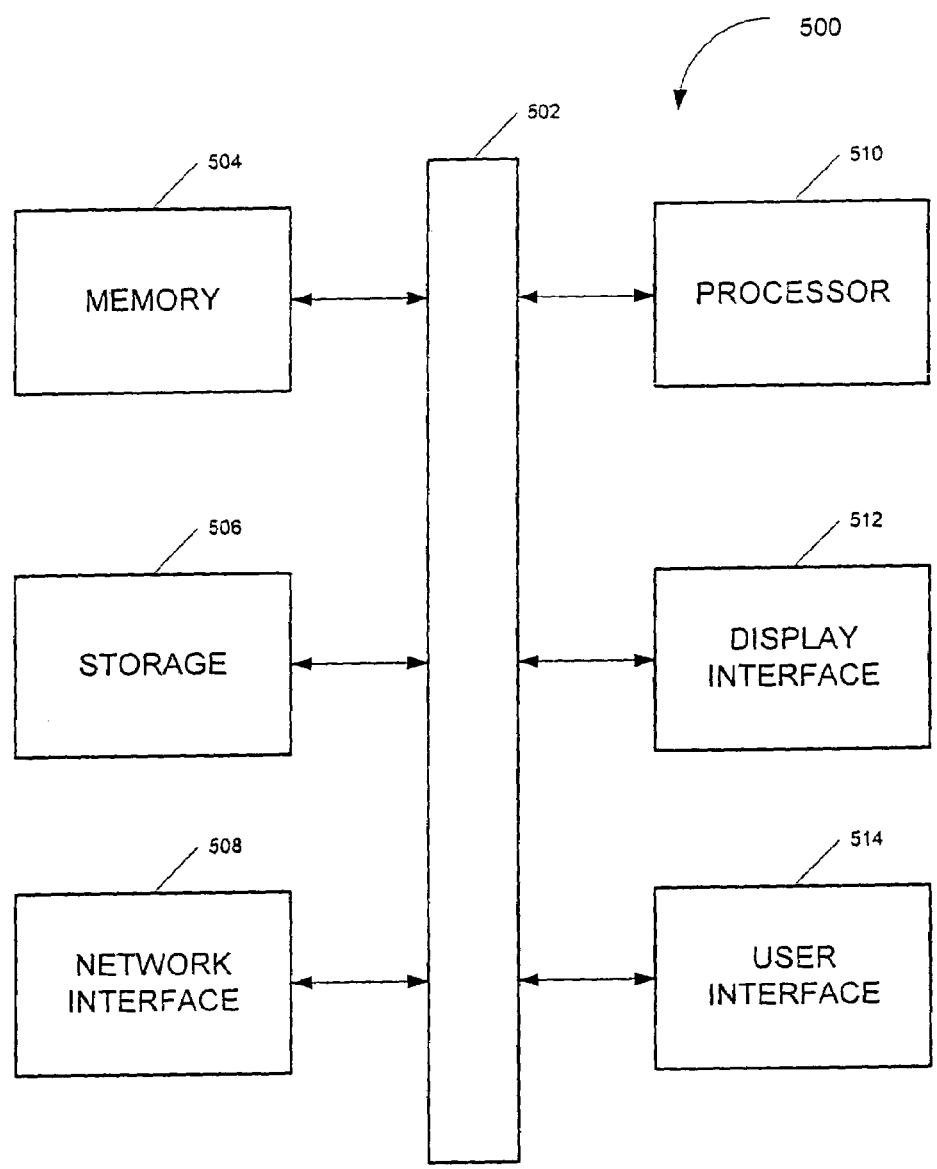
FIG. 5 is a diagram illustrating an example computer system that can comprise part of a location authority included in a tracking system configured in accordance with one embodiment of the invention.

FIG. 5 is a logical block diagram illustrating an example embodiment of a computer system 500 that can be used to implement a location authority 320.

As will be understood, some type of processing system is always at the heart of any computer system, whether the processing system includes one or several processors included in one or several devices. Thus, computer system 500 of FIG. 5 is a simple example of a processing system. In the example of FIG. 5, computer system 500 comprises a processing unit 510 configured to control the operation of computer system 500, memory 504, storage 506, a Input/Output (I/O) interfaces 508, a display output 512, a user interface 514, and a bus 502 configured to interface the various components comprising computer system 500.

Processing unit 510, in one embodiment, comprises a plurality of processing circuits, such as math coprocessor, network processors, digital signal processors, audio processors, etc. These various circuits can, depending on the embodiment, be included in a single device or multiple devices. Processing unit 510 also comprise an execution area into which instructions stored in memory 504 can be loaded and executed by processing unit 510 in order to control the operation of computer system 500. Thus, for example, by executing instructions stored in memory 504, processing unit 510 can be configured to implement the functionality of illustrated by the method of FIG. 4.

Memory 504 can comprise a main memory configured to store the instructions just referred to. In one embodiment, memory 504 can also comprise a secondary memory used to temporarily store instructions or to store information input into computer system 500, i.e., memory 504 can act as scratch memory also. Memory 504 can comprise, depending on the embodiment, a plurality of memory circuits, which can be included as a single device, or as a plurality of devices.

Storage 506 can include, in certain embodiments, a plurality of drives configured to receive various electronic media. For example, in one embodiment, storage 506 includes a floppy drive configured to receive a floppy disk, a compact disk drive configured to receive a compact disk, and/or a digital video disk drive configured to receive a digital videodisk. In another embodiment, storage 506 can also include disk drives, which can include removable disk drives. The drives included in storage 506 can be used, for example, to receive electronic media that has stored thereon instructions to be loaded into memory 504 and used by processing unit 510 to control the operation of computer system 500.

Further, storage 506 can also be configured to store the various information referred to above. Alternatively, storage 506 can include an interface configured to interface computer system 500 with an external storage device, such as database 322.

I/O interfaces 508 can be configured to allow computer system 500 to interface with various input and/or output devices. Thus, I/O interface 508 can comprise the interface hardware required to receive signals from wireless communication device 314. In on board implementations, I/O interface 508 can be configured to interface computer system 500 with RFID interrogators 306 and 308 as well as wireless communication device 316.

Display interface 512 can be configured to allow computer system 500 to interface with a display. Thus, computer system 500 can display information related to the location of forklift 304 and/or item 310 to a user via display interface 512.

User interface 514 can be configured to allow a user to interface with computer system 500. Thus, depending on the embodiment, user interface 514 can include a mouse interface, a keyboard interface, an audio interface, etc.

It should be clear that the general description of a computer system provided above is by way of example only and should not be seen to limit implementation of location authority 320 to any particular computer architecture or implementation. Rather any architecture or implementation capable of implementing the processes and functionality described above can be used to implement the systems and methods described herein.

While certain embodiments of the inventions have been described above, it will be understood that the embodiments described are by way of example only. Accordingly, the inventions should not be limited based on the described embodiments. For example, while embodiments involving a forklift were described above, it should be clear that the systems and methods described herein apply equally to embodiments for tracking a wide range of vehicles and items. Thus, the scope of the inventions described herein should only be limited in light of the claims that follow when taken in conjunction with the above description and accompanying drawings.

The invention claimed is:

1. A method for determining a location of a vehicle in a controlled area, comprising:
   receiving RFID tag information from a first RFID interrogator mounted on the vehicle;
   receiving RFID tag information from a second RFID interrogator mounted on the vehicle; and
   determining the location of the vehicle using the received RFID tag information from the first and second RFID interrogators.

2. The method of claim 1, wherein the information received from each of the RFID interrogators comprises information received from a plurality of RFID tags.

3. The method of claim 2, wherein the RFID tag information comprises a unique identifier for each of the plurality of RFID tags.

4. The method of claim 3, wherein determining the location comprises mapping the unique identifiers to stored coordinates.

5. The method of claim 1, wherein determining the location comprises determining a present location for the vehicle based on the information received from the first RFID interrogator.

6. The method of claim 5, wherein the present location of the vehicle is used to track the location of an item being transported by the vehicle.

7. The method of claim 1, further comprising determining a direction of the vehicle based on the information received from both of the RFID interrogators.

8. The method of claim 7, wherein determining the direction further comprises determining a present location for both of the RFID interrogators and comparing it with a stored last location for both of the interrogators.

9. The method of claim 7, further comprises determining a directional angle based on the information received from both of the RFID interrogators and increasing the accuracy of the determined direction using the determined directional angle.

10. The method of claim 1, further comprising storing the received information along with a time stamp, and using the stored time stamps to determine a speed of the vehicle.

11. The method of claim 1, further comprising detecting an event and updating a location for an item being transported by the vehicle in response to the detected event and based on the information received from the RFID interrogators.

12. The method of claim 1, further comprising transmitting a request for information to the vehicle, wherein the information received by the RFID interrogators is received in response to the transmitted request.

13. A vehicle configured to transport an item within a controlled area, the vehicle comprising:
   a first RFID interrogator configured to receive information from a plurality RFID tags installed in the controlled area;
   a second RFID interrogator configured to receive information from the plurality of RFID tags, the first and second RFID interrogators separated by a distance that is related to the distance between each of the plurality of RFID tags.

14. The vehicle of claim 13, further comprising a wireless communication device coupled with the first and second RFID interrogators, the wireless communication device configured to receive RFID tag information from the first and second RFID interrogators and to transmit the received RFID tag information over a wireless communication link.

15. The vehicle of claim 14, wherein the wireless communication device is further configured to receive a request for information over the wireless communication link.

16. The vehicle of claim 15, wherein the wireless communication device is further configured to receive RFID tag information from the first and second RFID interrogators in response to the received request for information and to transmit the received RFID tag information over the wireless communication link.

17. The vehicle of claim 15, further comprising a sensor coupled with the wireless communication device, the sensor configured to sense the occurrence of an event and communicate the occurrence of the event to the wireless communication device, the wireless communication device further configured to transmit the occurrence of the event over the wireless communication link.

18. A location authority configured to track the location of items within a controlled area, the location authority comprising:
   a communication interface configured to receive RFID tag information from a first and second RFID interrogator mounted on a vehicle transporting the item; and
   a processing unit configured to determine the location of the vehicle using the received RFID tag information from the first and second RFID interrogators.

19. The location authority of claim 18, wherein the RFID tag information comprises a unique identifier for each of a plurality of RFID tags.

20. The location authority of claim 19, wherein the processing unit is configured to determine the location by mapping the unique identifiers to stored coordinates.

21. The location authority of claim 18, wherein the processing unit is further configured to determine a present location for the vehicle based on the information received from the first RFID interrogator.

22. The location authority of claim 21, wherein the processing unit is further configured to use the present location of the vehicle to track the location of an item being transported by the vehicle.

23. The location authority of claim 18, wherein the processing unit is further configured to determine a direction of the vehicle based on the information received from both of the RFID interrogators.

24. The location authority of claim 23, wherein determining the direction further comprises determining a present location for both of the RFID interrogators and comparing it with a stored last location for both of the interrogators.

25. The location authority of claim 23, wherein the processing unit is further configured to determine a directional angle based on the information received from both of the RFID interrogators and to use the directional angle to increase the accuracy of the determined direction.

26. The location authority of claim 18, wherein the processing unit is further configured to associate a time stamp with the received RFID tag information and to store the received information along with the time stamp.

27. The location authority of claim 26, wherein the processing unit is further configured to use the stored time stamps to determine a speed of the vehicle.

28. The location authority of claim 18, wherein the communication interface is further configured to receive event information, and wherein the processing unit is further configured to update a location for an item being transported by the vehicle in response to the detected event and based on the information received from the RFID interrogators.

29. The location authority of claim 18, wherein the processing unit is further configured to generate a request for information and to transmit the request through the communication interface to the vehicle, and wherein the information received from the RFID interrogators is received in response to the transmitted request.

30. A system for determining the location of an item within a controlled area, the system comprising:
   a plurality of RFID tags;
   a vehicle configured to transport the item, the vehicle comprising:
      a first RFID interrogator configured to receive information from the plurality RFID tags,
      a second RFID interrogator configured to receive information from the plurality of RFID tags; and
   a location authority configured to track the location the item, the location authority comprising:
      a communication interface configured to receive RFID tag information from the first and second RFID interrogators, and
      a processing unit configured to determine the location of the vehicle using the received RFU) tag information from the first and second RFID interrogators.

31. The system of claim 30, wherein the first and second RFID interrogators separated by a distance that is related to the distance between each of the plurality of RFID tags.

32. The system of claim 30, wherein the vehicle further comprises a wireless communication device coupled with the first and second RFID interrogators, the wireless communication device configured to receive RFID tag information from the first and second RFID interrogators and to transmit the received RFID tag information over a wireless communication link to the location authority.

33. The system of claim 32, further comprising a second wireless communication device coupled with the server via the communication interface, the second wireless communication device configured to receive the RFID tag information over the wireless communication link.

34. The system of claim 33, wherein the wireless communication device is further configured to receive a request for information from the server over the wireless communication link.

35. The system of claim 34, wherein the wireless communication device is further configured to receive RFID tag information from the first and second RFID interrogators in response to the received request for information and to transmit the received RFID tag information over the wireless communication link to the server.

36. The system of claim 32, wherein the vehicle further comprises a sensor coupled with the wireless communication device, the sensor configured to sense the occurrence of an event and communicate the occurrence of the event to the wireless communication device, the wireless communication device further configured to transmit the occurrence of the event over the wireless communication link to the server.

37. The system of claim 30, wherein the RFID tag information comprises a unique identifier for each of a plurality of RFID tags.

38. The system of claim 37 further comprising a database configured to store coordinates for each of the plurality of RFID tags, and wherein the processing unit is configured to determine the location of the vehicle by mapping the unique identifiers to the stored coordinates.

39. The system of claim 30, wherein the processing unit is further configured to determine a present location for the vehicle based on the information received from the first RFID interrogator.

40. The system of claim 39, wherein the processing unit is further configured to use the present location of the vehicle to track the location of the item being transported by the vehicle.

41. The system of claim 30, wherein the processing unit is further configured to determine a direction of the vehicle based on the information received from both of the RFID interrogators.

42. The system of claim 41, further comprising a database configured to store information related to the location of the vehicle as determined by the processing unit, and wherein determining the direction further comprises determining a present location for both of the RFID interrogators and comparing it with a stored last location for both of the interrogators.

43. The system of claim 41, wherein the processing unit is further configured to determine a directional angle based on the information received from both of the RFID interrogators and to use the directional angle to increase the accuracy of the determined direction.

44. The system of claim 30, further comprising a database, wherein the processing unit is further configured to associate a time stamp with the received RFID tag information and to store the received information along with the time stamp in the database.

45. The system of claim 44, wherein the processing unit is further configured to use the stored time stamps to determine a speed of the vehicle.

46. The system of claim 30, wherein the communication interface is further configured to receive event information from the vehicle, and wherein the processing unit is further configured to update a location for the item being transported by the vehicle in response to the detected event and based on the information received from the RFID interrogators.

47. The system of claim 30, wherein the processing unit is further configured to generate a request for information and to transmit the request through the communication interface to the vehicle, and wherein the information received from the RFID interrogators is received in response to the transmitted request.

* * * * *

UNITED STATES PATENT AND TRADEMARK OFFICE
CERTIFICATE OF CORRECTION

| | | |
|---|---|---|
| PATENT NO. | : 7,038,573 B2 | Page 1 of 1 |
| APPLICATION NO. | : 10/658016 | |
| DATED | : May 2, 2006 | |
| INVENTOR(S) | : Bann | |

It is certified that error appears in the above-identified patent and that said Letters Patent is hereby corrected as shown below:

Col. 10, line 19, delete the word "(RFU)" and replace in lieu thereof the word -- RFID --.

Signed and Sealed this

Eleventh Day of July, 2006

JON W. DUDAS
*Director of the United States Patent and Trademark Office*